(No Model.)
G. J. DUDLEY.
WILLOW PEELER.
No. 257,438. Patented May 2, 1882.
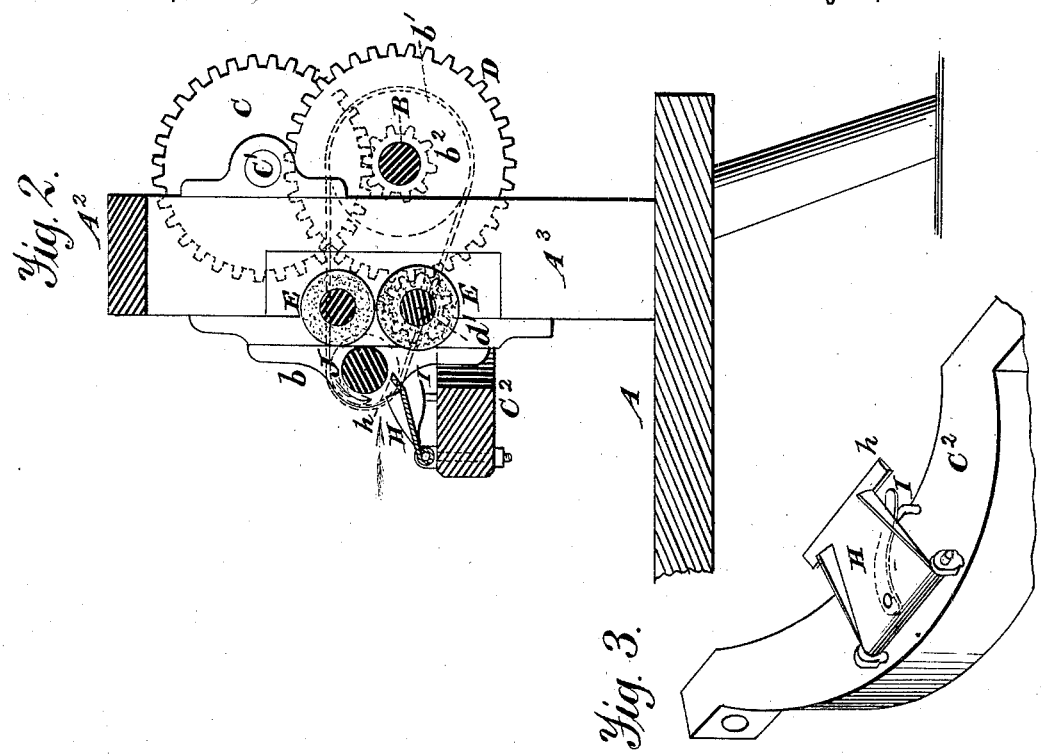
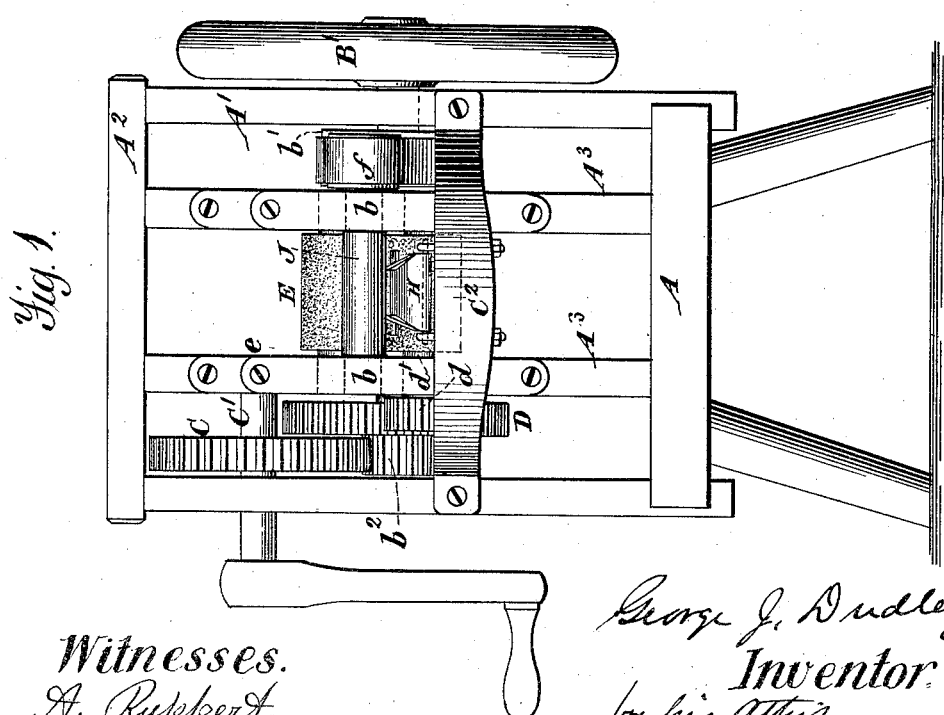
Witnesses.
A. Ruppert.
T. C. Huntemann
George J. Dudley
Inventor
by his Atty's
Edson Bro's
N. PETERS. Photo-Lithographer, Washington, D. C.

UNITED STATES PATENT OFFICE.

GEORGE J. DUDLEY, OF ST. PETER'S, INDIANA.

WILLOW-PEELER.

SPECIFICATION forming part of Letters Patent No. 257,438, dated May 2, 1882.

Application filed March 11, 1881. (No model.)

*To all whom it may concern:*

Be it known that I, GEO. J. DUDLEY, a citizen of the United States, residing at St. Peter's, in the county of Franklin and State of Indiana, have invented certain new and useful Improvements in Willow-Peeling Machines; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to a device for peeling the limbs or sprouts of the willow used in the manufacture of baskets and the like; and the novelty consists in the construction and arrangement of parts, as will be more fully hereinafter set forth, and specifically pointed out in the claim.

The device is intended to peel the branches of willow by cutting a strand of the peel from one side by an automatic cutter operated by peculiar mechanism for the purpose.

In carrying out the invention I employ the mechanisms shown in the accompanying drawings, in which—

Figure 1 is a rear elevation, partially in section; Fig. 2, a vertical section; and Fig. 3 is a detail view.

In carrying out the invention I refer to the drawings.

A represents the frame, having standards A' and a top cap-bar, $A^2$. Brackets upon these standards A' furnish bearings $b$ for a shaft, B, carrying fly-wheel B', pulley $b'$, and a pinion, $b^2$. The pinion $b^2$ gears with a cog-wheel, C, upon a shaft, C', above, to which is secured proper power-connection.

Between the standards A' are vertical standards $A^3$, in one of which is journaled, at $e$, the shaft C'.

Upon the shaft B is rigidly secured a gear-wheel, D, which meshes with a pinion, $d$, upon a shaft, $d'$, operating the lower one of a pair of feed-rollers, E. These rollers E are operated upon the one hand arbitrarily by the cogs D $d$, and upon the other by a belt-and-pulley connection, $f$, with the shaft of the upper feeding-roll, which is journaled within the inner standards, $A^2$, as shown. Upon a semicircular plate or platform, $C^2$, is pivoted a chuted cutter, H, having cutting-edge $h$; and a spring, I, serves to hold the cutting-edge in connection with the feed-aperture between the rolls E and with a guide-roll, J, as shown.

The operation is as follows: The willow or material is fed, butt-end foremost, in the pointing direction of the arrow, between the knife-edge $h$ of the cutter and the roll J, breaking the bark. The material is then taken between and pulled by the rolls E E, when it will be allowed to fall in a suitable receptacle or on the floor.

The important features of this invention lie in the spring knife-edged platform and the roll arranged in juxtaposition thereto, between which the willow is passed.

What I claim as new is—

In a branch or sprout peeling machine, a bed or table, A, and upright frame A' $A^2$ $A^3$, having secured thereto the platform $C^2$, cut away on its inner surface, as shown, in combination with the cutter H, having cutting-edge $h$ and converging sides, all in one piece, spring I, fly-shaft B B', having pulley $b'$ and pinion $b^2$, gear D, pinion $d$, rollers E, and guide-roll J, as and for the purposes set forth.

GEORGE J. DUDLEY.

Witnesses:
JOHN A. THALHEIMER,
SIMON DUDLEY.